United States Patent Office 3,293,012
Patented Dec. 20, 1966

3,293,012
PROCESS OF INFILTRATING DIAMOND PARTICLES WITH METALLIC BINDERS
William D. Smiley, Los Altos Hills, and Arthur G. Wilder, Los Altos, Calif., assignors, by mesne assignments, to Esso Production Research Company, Houston, Tex., a corporation of Delaware
No Drawing. Filed Nov. 27, 1962, Ser. No. 240,420
13 Claims. (Cl. 51—293)

The present invention relates to the manufacture of composite materials by infiltration and is particularly concerned with a process for infiltrating diamond particles with metallic binders to produce composite materials which are extremely hard and have high resistance to abrasion and erosion.

Infiltration techniques have been used in the past for the manufacture of composite materials containing hard metal carbides and metallic binders. Such techniques involve in essence the packing of hard metal carbide powder in a suitable mold, the addition of particles of a metallic binder which in the molten state will wet the carbide powder, and the heating of the mold and its contents to a preselected infiltration temperature above the melting point of the binder metal. As the binder approaches this infiltration temperature, the molten metal flows into the interstices between the powder granules. A metallurgical bond between the binder and granules is formed as the mold cools, thus resulting in a material containing a continuous binder phase within which the powder granules are bonded in place. It has been suggested that diamond powder might be used in this way to produce materials harder and more erosion resistant than those made with the carbide powder but efforts to do this have been unsuccessful. Tests have shown that the surfaces of diamond powder granules are not wet by molten metallic binders and that a metallurgical bond between the diamond granules and binders cannot be obtained. No satisfactory method for overcoming this difficulty has been found and hence composite materials consisting essentially of diamond powder granules and a binder metal have not been available in the past.

It is therefore an object of the present invention to provide an improved infiltration process utilizing diamond particles and metallic binders. Another object is to provide an infiltration process for the production of composite materials containing diamond powder granules held in place by a thin metallic film metallurgically bonded to the diamond granules. A further object is to provide an infiltration process for producing composite materials containing diamond powder and metallic binders which are harder and more resistant to abrasion and erosion than composite materials available in the past. Still other objects will become apparent as the invention is described in greater detail hereafter.

In accordance with the invention, it has now been found that many of the difficulties encountered heretofore in the infiltration of diamond powder with metallic binders can be avoided by depositing a reactive metal on the diamond granules during the infiltration process. Laboratory work and infiltration tests have shown that the alloying of titanium or zirconium with a metallic binder within the interstices between diamond powder granules results in sufficient wetting of the powder to permit infiltration with a molten metal or alloy and that composite materials made up of diamond particles bonded together by thin metallic films can thus be produced. These materials, essentially composite diamonds, are significantly harder than composite materials available in the past and are particularly useful for hard surfacing applications and for the manufacture of inserts to be used on metal saws, drill bits, wire dies and similar tools.

The diamond particles employed to produce the improved composite materials of the invention will generally range in size between about 10 mesh and about 400 mesh on the Tyler screen scale. The methods utilized for separating diamonds from gangue minerals with which they are often associated and for cutting and shaping diamonds normally result in the production of substantial quantities of fine diamond powder or dust which has few uses except in grinding wheels where resins are used for bonding purposes and as a lapping material. Because this material is available in quantity at relatively low cost, the use of such fine powder or dust is generally preferred. Larger particles or grit may be utilized in certain instances, however.

The production of composite materials having maximum resistance to abrasion and erosion generally requires that the diamond particles employed be packed together as closely as possible and that the thickness of the metallic film used to bond the particles together be kept to a minimum. This can best be accomplished by employing diamond powder granules graded into two or more distinct sizes. By selecting the sizes so that the small granules occupy most of the space between the larger granules, very close packing can be achieved. Tests have shown, for example, that a diamond concentration of about 90% by volume can be obtained by utilizing a mixture of diamond powder granules containing about 10% by weight of granules having an average diameter of about 7 microns, about 25% by weight of granules having an average diameter of about 37 microns, and about 65% by weight of granules having an average diameter of about 350 microns. In general, two or more distinct sizes selected so that the diameter of one size exceeds that of the other by a factor of from about 5 to about 10 is advantageous. The powder should be thoroughly mixed to obtain even distribution of the powder granules but sufficient mixing or vibration to produce grading of the granules should be avoided.

The diamond particles referred to above are employed in conjunction with metallic binders which have melting points between about 1200° F. and about 2750° F. Binders melting at temperatures substantially in excess of about 2750° F. tend to cause excessive graphitization of the diamond powder granules and should therefore generally be avoided. A variety of metals and metal alloys may be utilized for purposes of the invention. Suitable metals and alloys include, for example, (a) copper; (b) silver; (c) copper—53%, nickel—37%, zinc—10%; (d) copper—55%, nickel—18%, zinc—27%; (e) copper—60%, nickel—29%, tin—11%; (f) copper—40%, zinc—60%; (g) copper—63%, nickel—5%, tin—32%; (h) copper—62%, nickel—10%, tin—28%; (i) copper—58%, nickel—15%, tin—27%; (j) nickel—55%, copper—35%, tin—10%; (k) nickel—55%, copper—35%, manganese—5%, silicon—3%, iron—2%; (l) nickel—55%, copper—32%, manganese—5%, silicon—3%, molybdenum—3%; (m) nickel—40%, copper—32%, manganese—5%, silicon—3%, iron—2%, molybdenum—3%, cobalt—15%; (n) iron—90%, nickel—10%; (o) iron—97%, carbon—3%; (p) nickel—63%, copper—30%, iron—2%, manganese—0.9%, silicon—4%, carbon—0.1%; (q) nickel—67%, copper—30%, iron—1.4%, manganese—1%; (r) nickel—47.8%, copper—29.4%, tin—8.4%, iron—14.4%; (s) nickel—49.4%, copper—31.4%, tin—9%, niobium carbide—10%; (t) nickel—49.4%, copper—31.4%, tin—9%, tantalum carbide—10%; (u) nickel—40%, copper—32%, cobalt—15%, manganese—5%, silicon—3%, molybdenum—3%, iron—2%; (v) nickel—47.0%, copper—30.4%, tin—

9.2%, manganese—2.0%, silicon—2.0%, iron—9.4%; (w) nickel—42.9%, copper—27.8%, tin—8.4%, silicon—1.8%, manganese—1.9%, iron—17.2%; (x) nickel—80.0%, boron—1.0%, carbon—0.1%, chromium—4.0%, silicon—4.0%, iron—0.5%, molybdenum—4.7%, tin—5.7%; (y) copper—25.0%, nickel—40.0%, boron—2.0%, carbon—0.5%, chromium—20.0%, silicon—1.5%, iron—5.0%, molybdenum—6.0%; (z) nickel—60.0%, copper—15.0%, boron—4.0%, carbon—0.1%, chromium—10.0%, silicon—3.0%, iron—0.5%, molybdenum—0.8%, tin—6.6%; (aa) boron—1.3%, nickel—47.0%, chromium—16.9%, copper—21.6%, carbon—0.8%, silicon—2.1%, iron—4.8%, tin—5.5%; (bb) nickel—71.0%, chromium—19.8%, silicon—3.5%, boron—3.2%, iron—1.5%, carbon—1.0%; (cc) nickel—49.4%, copper—31.4%, tin—9.0%, tungsten carbide—10%; (dd) nickel—46.4%, copper—30.2%, tin—8.7%, tungsten carbide—14.1%, cobalt—0.6%; (ee) iron—1.25%, nickel—68.67%, chromium—5.0%, carbon—0.08%, silicon—1.25%, boron—1.25%, copper—17.5%, tin—5.0%; (ff) nickel—40%, cobalt—15%, copper—32%, manganese—5%, molybdenum—3%, silicon—3%, iron—2%; (gg) nickel—82.35%, chromium—10%, iron—2.5%, silicon—2.5%, boron—2.5%, carbon—0.15%; (hh) cobalt—40%, nickel—27%, chromium—19%, iron—1%, silicon—4%, boron—3%, molybdenum—6%; and (ii) iron—14.8%, nickel—46.2%, carbon—0.7%, silicon—0.48%, copper—29.9%, tin—8.4%. It will be understood that these metals are exemplary of those which may be employed for purposes of the invention but that a number of other metals and metal alloys which melt at temperature within the proper range will also be satisfactory. Silver solders, monel metals, and brazing alloys are examples of such other metals which will be familiar to those skilled in the art. The optimum infiltration conditions for a particular binder composition can be readily determined by preparing test specimens utilizing the binder selected.

The preferred binders for purposes of the invention are those which contain about 50% or more by weight of one or more metals from Group VIII, Series 4, of the Periodic Table and melt at temperatures in the range between about 1800° F. and about 2600° F. Such binders may contain, in addition to iron, nickel, cobalt or a mixture of these metals, lesser amounts of copper, tin, manganese, chromium, aluminum, molybdenum, beryllium, bismuth, boron, cadmium, carbon, silicon, silver, titanium, tungsten, zirconium, niobium, tantalum and other materials in sufficient quantities to alter the melting point or increase the binder hardness.

The reactive metal compositions which are utilized in producing the improved composite materials of the invention are titanium and zirconium hydrides. Studies have shown that titanium and zirconium lose their reactivity and ability to bond diamonds if they are contaminated by adsorbing oxygen from the atmosphere and that the metals must therefore be employed in the form of the hydrides to prevent losses in activity. The hydrides employed are alloy-hydrides composed of solid solutions of titanium or zirconium metal and hydrogen. Several different phases of each hydride exist, depending upon the amount of hydrogen absorbed in the metal. The absorption is a reversible phenomenon. At temperatures sufficient to melt the binder alloys employed in the process of the invention, the hydrogen is given off and essentially pure titanium or zirconium metal remains. The metal thus obtained dissolves in the molten binder alloy and reacts with carbon at the surface of the diamond particles to form titanium or zirconium carbide. The alloys wet the surfaces of the diamond powder granules in the presence of the titanium or zirconium metal and thus a metallurgical bond between the diamond particles and the surrounding metal is obtained.

In utilizing diamond powder to produce the composite material of the invention, the powder is generally first cleaned with alcohol or a similar solvent to remove dust, oil and other foreign matter. The powder is then placed in a clean carbon or ceramic mold containing a cavity of the desired shape. The use of a carbon mold is generally preferred, since this insures a reducing atmosphere during infiltration. The mold may be vibrated as the powder is added in order to obtain a densely packed mass or, if desired, may be pressed at a pressure of about 100 to about 200 pounds per square inch in order to assure close packing of the powder granules. As pointed out earlier, it is generally preferred to utilize a mixed diamond powder containing granules of two or more distinct sizes. The use of a mixture containing relatively large granules and smaller granules which differ in diameter from the larger ones by a factor of from about 5 to about 10 permits closer packing of the granules and thus reduces the thickness of the binder metal film in the finished composite material. This is important in applications where extremely high resistance to abrasion and erosion is required. In other applications of the material, a somewhat higher binder metal content may be satisfactory and hence a diamond powder compact containing larger interstices may be employed.

After the mold has been filled with the required amount of diamond powder, a mixture of the powdered metal hydride and the binder metal to be employed is introduced into the interstices between the diamond powder granules. This is preferably done by suspending the powdered hydride and binder in a volatile vehicle such as an alcohol, an ether or the like and saturating the diamond powder with the suspension. The hydride and binder utilized in the suspension should be ground to a particle size substantially smaller than the smallest diamond granules employed. With diamond powder between about 100 mesh and about 325 mesh in size for example, a hydride-binder mixture screened to a size less than about 400 mesh may be used. Powder of larger size will be suitable in cases where the diamond granules are bigger and hence the voids between the granules are somewhat larger. A suspension containing from about 0.5% to about 25% of the hydride and from about 75% to 99.5% of the binder will generally be satisfactory. The optimum amount of hydride and binder in a particular instance will depend somewhat upon the specific hydride and binder utilized. As the volatile vehicle in which the hydride-binder powder is suspended evaporates, the powder is deposited within the voids between the diamond granules. The addition of the vehicle containing suspended powder may be repeated several times if desired but, because of the very small amount of the reactive metal required, it is generally necessary to saturate the diamond powder and allow the vehicle to evaporate only once.

Following the addition of the powdered hydride and binder as described, the infiltrant metal to be used in producing the composite material may be added to the mold. The composition of the infiltrant metal employed may be identical to or different from that of the binder metal used. The metals and alloys useful as binders are also satisfactory infiltrants. The infiltrant metal is normally added in the form of pellets placed on top of the diamond particles or in a mold cover containing openings through which the metal may flow as the pellets melt. An alternate method is to heat the infiltrant metal in a separate crucible or other vessel and then pour the molten metal into the mold above the diamond powder at the proper time. This latter method has certain advantages in some cases in that it permits better control of the infiltration time and temperature conditions than can be obtained if the infiltrant is heated in the mold.

It is generally preferred to preheat the assembled mold at a temperature between about 300° and about 600° F. for an hour or longer in order to eliminate gases from the mold prior to the infiltration step. Following this preheating step, the mold containing the diamond particles, the mixed titanium or zirconium hydride-binder powder, and the infiltrant metal pellets is placed in a suitable furnace and heated to a temperature between about 1250° F. and about 2800° F. in a non-oxidizing atmosphere and preferably under vacuum. The temperature employed will depend primarily upon the melting point of the binder metal utilized in conjunction with the titanium or zirconium hydride and the infiltrant metal employed. Copper-nickel alloys generally infiltrate readily due to capillary forces at temperatures between about 2000° F. and about 2350° F. for example; whereas iron-based alloys and similar binders may require somewhat higher temperatures because of their higher melting points. Certain other metals may be be used at lower temperatures. The precise temperature required for optimum results with a particular binder metal and infiltrant can be readily determined by preparing small specimen molds, filling them with the diamond particles and hydride-binder powder to be used, and then pouring the selected infiltrant metal into them at various temperatures. Examination of the resulting specimens after they have cooled will clearly show whether satisfactory infiltration occurred at the temperatures employed.

As the mold and its contents approach the selected infiltration temperature, the titanium or zirconium hydride in the interstices between the diamond granules gives up hydrogen which is vented. This leaves a mixture of essentially pure titanium or zirconium metal and binder metal in the interstices. As the temperature is then further increased, the binder metal melts and alloys with the titanium or zirconium. The presence of these latter constituents permits the wetting of the diamond powder granules and hence results in the formation of a very thin metallic film in contact with the granules.

On reaching the infiltration temperature, the infiltrant metal in the upper part of the mold tends to flow downwardly into the interstices between the diamond powder granules. In order to promote and accelerate infiltration, a driving force may be applied to the infiltrant metal. This can be done by utilizing a reservoir of molten metal of sufficient size to create a substantial hydrostatic head, by employing a closed mold provided with an inlet through which hydrogen or an inert gas can be introduced into the mold above the molten metal in order to force it downwardly into the powdered interstices, or by utilizing a piston to apply pressure to the molten binder. This latter procedure is generally preferred. The amount of pressure utilized will depend upon the size of the diamond particles employed. Where very fine particles are used, capillary forces are generally sufficient to cause rapid infiltration and hence no external pressure is required. In like manner, no pressure need be applied where the particles and interstices between them are relatively large. With particles of intermediate sizes, pressures in the range between about 0.1 pound per square inch and about 100 pounds per square inch will generally be used to aid infiltration. During infiltration, the molten infiltrant metal flows into and fills the voids between the diamond powder granules. In doing so, it alloys with the titanium or zirconium metal-binder alloy previously formed and thus produces a composite structure in which the diamond particles are metallurgically bonded to a thin continuous metallic film.

The composite materials of the invention can be bonded to steel or similar ferro-alloy surfaces during the infiltration process if desired. By positioning a steel tool or similar ferro-alloy article in a suitable mold, placing diamond powder granules in voids adjacent the surfaces of the article, introducing the metal hydride and binder alloy powder, and thereafter infiltrating with a molten infiltrant metal, a bond between the diamond powder granules, the binder-hydride alloy, the infiltrant metal and the ferro-alloy surface can be formed. This simplifies the fabrication of tools and other articles which require an extremely hard outer surface resistant to abrasion or erosion. Care should be taken in fabricating such articles to avoid damage to the steel or other ferro-alloy during the cooling step following infiltration. It is generally preferred to cool the mold rapidly to a temperature below the melting point of the binder metal and then cool slowly to room temperature in order to avoid undue thermal stressing of the steel or other ferro-alloy metal.

The invention is further illustrated by the following examples:

*Example I*

A composite diamond composed of fine diamond powder granules bonded together by a thin metallic film prepared by first placing diamond powder screened to a size of about 65 mesh on the Tyler screen scale in a carbon mold containing a cylindrical cavity ½ inch in diameter and 1 inch deep. A mixture containing about 10% of titanium hydride and about 90% of a binder metal was then prepared. The binder metal employed was an alloy composed of about 55% nickel, about 35% copper, and about 10% tin. This alloy and the titanium hydride, obtained from a commercial source, were screened to eliminate particles greater than about 325 mesh and then thoroughly mixed. The mixture was suspended in alcohol and the suspension was then poured into the mold. The alcohol rapidly evaporated, leaving the fine particles of the binder and hydride in the interstices between the diamond powder granules.

Pellets of an infiltrant metal having the same composition as the binder metal used were placed in the upper part of the mold above the diamond powder. A cover fitted with a piston for applying pressure to the molten infiltrant metal was attached to the mold. The assembled mold was placed in an electric furnace and heated to a temperature of about 2200° F. under vacuum. After the mold had reached this temperature, the piston was pushed down in order to force the now molten infiltrant metal downwardly into the voids between the diamond powder granules. After about 10 minutes at the infiltration temperature, the mold was removed from the furnace and allowed to cool. The mold was then opened and the composite structure was removed.

Examination of the structure of the composite material produced as described in the preceding paragraph showed it to be made up of closely spaced diamond powder granules bonded together by an extremely thin metallic film. There were no indications of poor bonding or incomplete infiltration. The invention thus provides an effective means for the preparation of composite diamond materials which are much harder and more erosion resistant than materials available in the past and are therefore useful in the manufacture of cutting tools, wire dies, diamond saws and similar devices.

*Example II*

A diamond surfaced cutting tool is produced by preparing a carbon mold containing a cavity conforming to the desired final shape of the tool. A steel tool shank is placed in the mold with the surface to which the diamond-containing material is to be bonded facing upwardly. An evenly dispersed mixture of fine diamond powder containing granules having an average diameter of about 10 microns in a concentration of about 10% by weight, granules having an average diameter of about 35 microns in a concentration of about 25% by weight, and granules having an average diameter of about 350 microns in a concentration of about 65% by weight, is poured into the mold above the steel shank. A powdered mixture containing about 5% zirconium hydride and about 95% of a metallic binder sized to pass a 400 mesh screen is prepared. The binder employed contains about 63% nickel, about 40% copper, about 2% iron, about 0.9% manganese, about 4% silicon and about 0.1% carbon. The powdered hydride and binder mixture is suspended in alcohol and introduced into the mold to fill the interstices between the diamond powder granules.

Following the introduction of the powdered hydride and binder metal, pellets of infiltrant metal having the same composition as the binder metal are placed in the mold above the diamond powder. A mold cover fitted with a close-fitting piston for applying pressure to the infiltrant metal after it melts is attached to the mold. The assembled mold is then heated in an induction coil to a temperature of about 2300° F. After this temperature is reached, force is applied to the piston to force the molten infiltrant metal into the interstices between the powdered granules. The mold is then removed from the induction heater and allowed to cool.

The finished tool consists of a steel shank to which a diamond-containing cutting element is metallurgically bonded. The diamond powder granules are held to one another and to the steel by means of a thin metallic film containing zirconium and the elements present in the binder alloy. This tool is much harder and more resistant to abrasion and erosion than tools surfaced with hard metal carbides, oxides and similar materials and can therefore be used in applications where abrasion and erosion are severe.

What is claimed is:

1. A process for the preparation of a composite material which comprises introducing a finely-divided reactive metal hydride selected from the group consisting of titanium hydride and zirconium hydride and a finely-divided metallic binder having a melting point between about 1200° F. and about 2750° F. into the interstices within a mass of diamond particles and thereafter infiltrating said mass of diamond particles with a molten infiltrant metal having a melting point between about 1200° F. and about 2750° F. at an infiltration temperature above the melting point of said metallic binder and said infiltrant metal.

2. A process as defined by claim 1 wherein said reactive metal hydride and metallic binder are introduced into said mass of diamond particles as a suspension in a volatile vehicle and said vehicle is subsequently evaporated from said mass of diamond particles.

3. A process as defined by claim 1 wherein said mass of diamond particles is infiltrated with said molten infiltrant metal under external pressure.

4. A process as defined by claim 1 wherein said mass of diamond particles contains particles of at least two distinct sizes, particles of one size occupying voids between particles of the other size.

5. A process as defined by claim 1 wherein said binder metal and infiltrant metal have the same composition.

6. A process as defined by claim 1 wherein said diamond particles are between about 10 mesh and about 400 mesh on the Tyler screen scale in size.

7. A process for the manufacture of a diamond-containing composite material which comprises preparing a compact of diamond powder containing powder granules of two distinct sizes, granules of one size occupying voids between granules of the other size, introducing a finely-divided reactive metal hydride selected from the group consisting of titanium hydride and zirconium hydride and a finely-divided binder metal having a melting point between about 1200° F. and about 2750° F. into the interstices in said compact in a volatile vehicle, evaporating said volatile vehicle, and thereafter infiltrating said compact with a molten infiltrant metal having a melting point between about 1200° F. and about 2750° F. at an infiltration temperature above the melting point of said binder metal and said infiltrant metal.

8. A process as defined by claim 7 wherein said diamond powder granules of one size have an average diameter of from about five to about ten times the average diameter of said diamond powder granules of the other size.

9. A process as defined by claim 7 wherein said binder and infiltrant metal each contain at least 50% by weight of a metal selected from Group VIII, Series 4, of the Periodic Table and have melting points between about 1800° F. and about 2600° F.

10. A process for the manufacture of a composite material which comprises preparing a compact of diamond powder, introducing into the interstices of said compact a volatile vehicle containing in suspension finely-divided titanium hydride and a finely-divided metallic binder having a melting point between about 1200° F. and about 2750° F., evaporating said volatile vehicle from said compact, and infiltrating said compact with a molten infiltrant metal having a melting point between about 1200° F. and about 2750° F. at an infiltration temperature in excess of the melting point of said metallic binder and said infiltrant metal.

11. A process for the manufacture of a composite material which comprises preparing a compact of diamond powder, introducing into the interstices of said compact a volatile vehicle containing in suspension finely-divided zirconium hydride and a finely-divided metallic binder having a melting point between about 1200° F. and about 2750° F., evaporating said volatile vehicle from said compact, and infiltrating said compact with a molten infiltrant metal having a melting point between about 1200° F. and about 2750° F. at an infiltration temperature in excess of the melting point of said metallic binder and said infiltrant metal.

12. A process for the manufacture of a composite material which comprises preparing a compact of diamond powder containing powder granules of two distinct sizes, granules of one size occupying spaces between granules of the other size, introducing into the interstices of said compact a volatile vehicle containing in suspension finely-divided titanium hydride and a finely-divided binder metal containing at least 50% by weight of a metal from Group VIII, Series 4, of the Periodic Table, said binder metal having a melting point between about 1800° F. and about 2600° F., evaporating said volatile vehicle from said compact, and infiltrating said compact with a molten infiltrant metal containing at least 50% by weight of a metal from Group VIII, Series 4, of the Periodic Table and having a melting point between about 1800° F. and about 2600° F. at an infiltration temperature in excess of the melting point of said metallic binder and said infiltrant metal.

13. A process as defined by claim 12 wherein pressure is applied to said molten infiltrant metal in contact with said compact to promote and accelerate infiltration.

References Cited by the Examiner
UNITED STATES PATENTS

| | | | |
|---|---|---|---|
| 2,240,829 | 5/1941 | Bevillard | 51—309 |
| 2,367,404 | 1/1945 | Kott | 51—309 |
| 2,578,167 | 12/1951 | Bjorklund | 51—309 |
| 2,679,452 | 5/1954 | Cotter | 51—309 |
| 3,178,273 | 4/1965 | Libal | 51—307 |

ALEXANDER H. BRODMERKEL, *Primary Examiner.*

D. J. ARNOLD, *Assistant Examiner.*